Dec. 25, 1928. C. H. VON GLAHN Re. 17,175
CHEESE SLICER
Original Filed Jan. 2, 1926 2 Sheets-Sheet 1
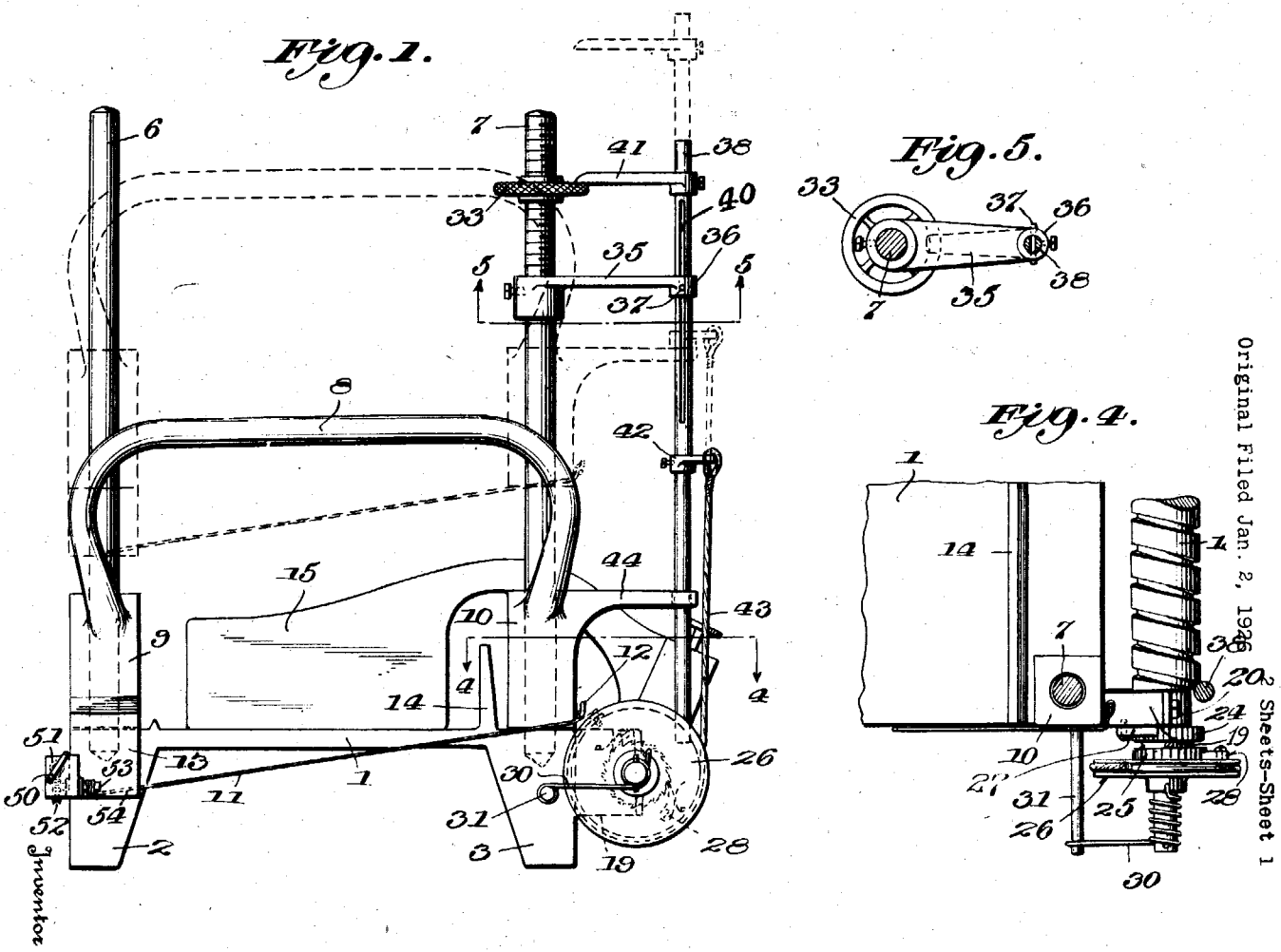
Inventor
Charles H. von Glahn,
By Conway P. Coe
Attorney Dec. 25, 1928. C. H. VON GLAHN Re. 17,175

CHEESE SLICER

Original Filed Jan. 2, 1926 2 Sheets-Sheet 2

Inventor

Charles H. von Glahn,

By Conway P. Coe

Attorney

Reissued Dec. 25, 1928. Re. 17,175

UNITED STATES PATENT OFFICE.

CHARLES H. VON GLAHN, OF BROOKLYN, NEW YORK.

CHEESE SLICER.

Original No. 1,611,965, dated December 28, 1926, Serial No. 78,883, filed January 2, 1926. Application for reissue filed May 25, 1928. Serial No. 280,626.

This application is a continuation in part of my copending application, Serial No. 68,642, filed November 12, 1925, for cheese slicers.

The invention relates to slicers for brick cheese, butter, ice cream, soap and similar plastic or semi-plastic materials, and has for an object to provide an improved apparatus whereby material may be cut into slices of predetermined thickness.

A further object of the invention is to provide an apparatus operable by one hand, in which the material is automatically advanced while the cutting element is being moved.

The invention consists in the novel construction hereinafter described, and illustrated in the accompanying drawings, in which:

Fig. 1 is a front elevation of an apparatus embodying the invention;

Fig. 4 is a detail view taken on the line 4—4 of Fig. 1;

Fig. 5 is a detail view taken on the line 5—5 of Fig. 1.

Figures 2, 3:
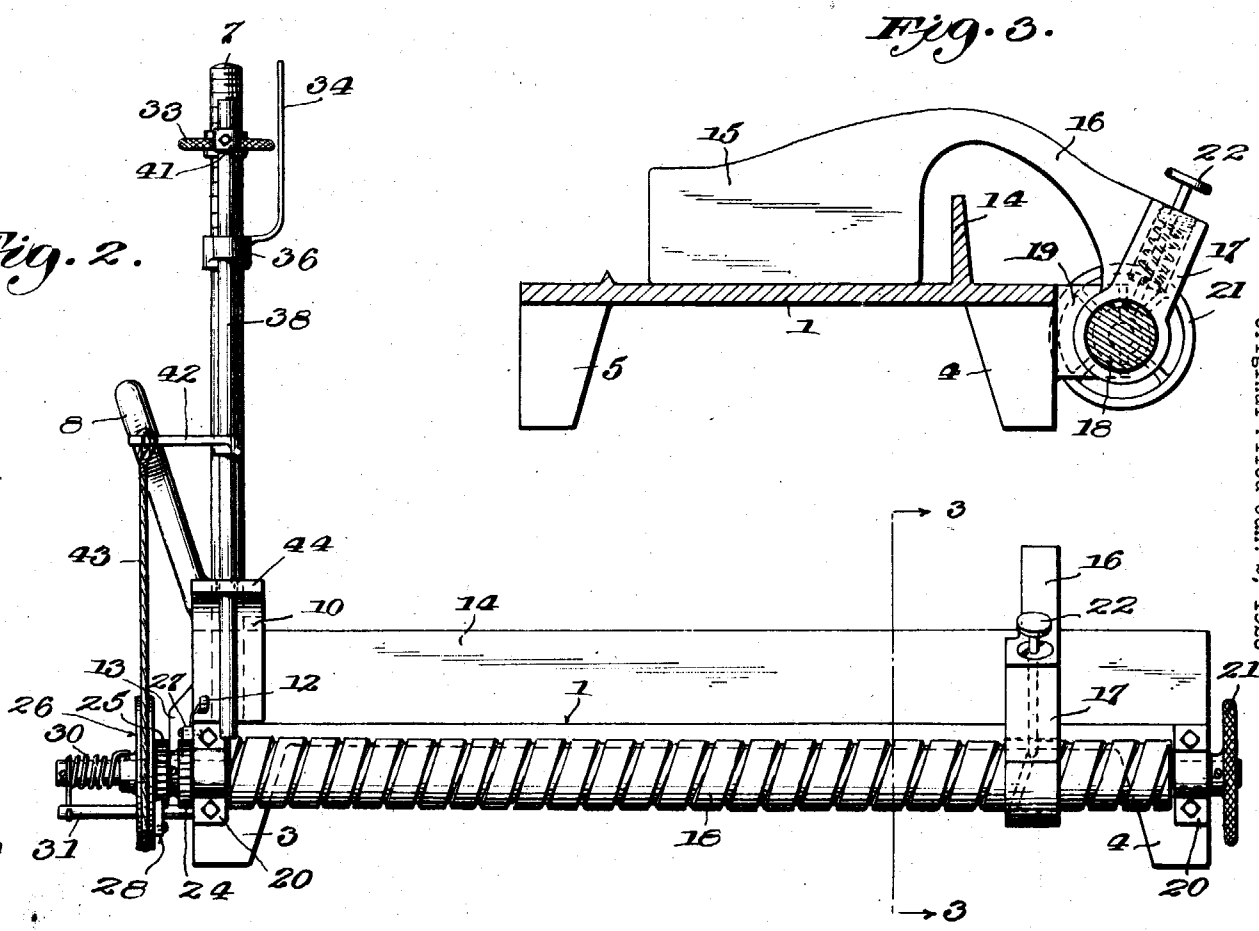
Fig. 2 is a side view of the same.
Fig. 3 is a sectional view taken on the line 3—3 of Fig. 2.

In the drawings, the slicer comprises a base consisting of a floor 1 having an integral guide wall 14 at one side and supported a short distance above the counter or other surface by integral legs 2, 3, 4, and 5. The forward legs 2 and 3 are of substantial dimensions, as shown, and provided with threaded bores in which are mounted vertical posts 6 and 7, on which a cutter is mounted for vertical reciprocation. The cutter consists of an inclined cutting wire 11 and a frame comprising a handle 8 and two sleeves 9 and 10 formed integral therewith and adapted to receive posts 6 and 7 in sliding relation. Cutting wire 11 extends between the sleeves, being secured to sleeve 10 by a pin 12 and to sleeve 9 by a tightening key as will be more fully described. Sleeve 9 has a depending flange 13 through which the wire 11 passes.

A feeding plate 15 slides on the floor 1 and is carried by an arcuate arm 16 having an end 17 adapted to slide on a rod 18 journaled in lateral studs 19 by means of straps 20. Rod 18 is provided with a spiral groove forming a left-hand thread, and has a hand wheel 21 keyed to its rear end. A clutch member 22 passes through the end 17 of arm 16 and engages the spiral groove of rod 18, being held into engagement therewith by its own weight or by a spring, as desired. It will thus be seen that rotation of rod 18 will cause plate 15 to move longitudinally of the floor 1.

Ratchet wheels 24 and 25 are keyed to the forward end of rod 18, and sheave 26 is journaled on the rod. A pawl 27, secured to forward stud 19, engages ratchet wheel 24, and a pawl 28, secured to sheave 26, engages ratchet wheel 25. A coiled spring 30 is secured to a rod 31, projecting from leg 3, and urges sheave 26 in the clockwise direction, as seen in Fig. 1.

The upper end of post 7 is threaded to receive a wheel 33. A scale 34, graduated in inches or calibrated to read in pounds, extends upwardly adjacent the wheel 33, while an arm 35 extends from the post and is provided at its outer end with a collar 36 having a diametric pin 37 and adapted to receive a vertical rod 38 in sliding relation, pin 37 extending through slot 40, in the rod. An arm 41 extends from rod 38 to engage the upper surface of wheel 33 thereby to support the rod in position. An arm 42 is secured to rod 38 below slot 40, and a cable 43 depends from the outer end of arm 42 and is secured in the groove of sheave 26. Sleeve 10 has a lateral projection 44, bored at its outer end to receive the rod 38 in sliding engagement, and adapted to contact, in the upward movement of the cutter frame, with the collar of arm 42.

The tensioning device is mounted on flange 13 and comprises a threaded key 50 mounted in a stud 51, formed integral with flange 13. The threads of key 50 engage gear 52, having a shank 53 upon which wire 11 is wound, the arrangement being similar to that of a guitar key. Wire 11 passes through a diagonal aperture 54 from the rear face to the forward face of the flange. It will thus be seen that the cutting wire may be tightened by turning the key 50, and that the wire 11 is retained in an inclined position to facilitate its cutting action.

The operation of my device is as follows: A brick of cheese or other article to be sliced is placed on the floor of the cutter with one end lying in the cutting plane and one side bearing against wall 14. Pin 22 is raised, and plate 15 is slid along the floor until it bears against the article. The pin is then released, and wheel 21 rotated until the pin falls into engagement with the spiral groove of rod 18. The wheel 33 is adjusted until the desired thickness or weight of slice is read on scale 34.

The cutter frame is then raised, and as it approaches the upward limit of its movement, extension 44 engages arm 42, thereby raising rod 38 and causing cable 43 to rotate sheave 26. Pawl 28 engages ratchet wheel 25, thereby rotating rod 18, moving plate 15 toward the cutter frame and causing the article to be sliced to protrude beyond the cutting plane by the amount indicated on scale 34.

The upward movement or return stroke of the cutter is arrested by the upper surface of projection 42 contacting with the collar 36. The cutter frame is then depressed, causing wire 11 to sever a slice of the material. Rod 38 moves down with the cutter frame until its movement is arrested by the contact of arm 41 with wheel 33, while spring 30 which has been flexed by the up stroke rotates sheave 26, winding cable 43 upon the sheave. The clockwise rotation of the sheave upon rod 18 tends to turn the rod with it, and the purpose of ratchet wheel 24 and pawl 27 is to prevent such rotation of the rod.

It will be seen that the feeding operation is entirely automatic, since the reciprocation of handle 8 actuates both the cutting and feeding mechanism.

I wish it to be understood that various changes in the parts, and in their combination and arrangement may be made, such changes to be limited only by the scope of the subjoined claims.

Having described my invention, what I claim as new and desire to secure by Letters Patent of the United States is:

1. In a slicer having a frame, a cutter mounted thereon, a feeding member for advancing material to said cutter, a threaded rod journaled in said frame, and means operable by the movement of said cutter to rotate said threaded rod; a clutch member carried by said feeding member and normally adapted to be forced into engagement with the threads of said rod, said clutch member being movable out of engagement with said threads to permit retraction of said feeding member.

2. In a slicer having a floor for receiving material, a feeding plate slidably mounted thereon, and a reciprocating cutting mechanism mounted adjacent said floor; a threaded rod operable by the upward movement of said cutting mechanism to advance said plate toward said cutting mechanism.

3. In a slicer having a frame, a reciprocating cutter mounted thereon, a feeding member for advancing material to said cutter, a threaded rod journaled in said frame, and means operable by the movement of said cutter to rotate said threaded rod; a clutch member mounted in said feeding member and yieldingly engaging the threads of said rod, said clutch member being movable out of engagement with said threads to permit retraction of said feeding member.

4. A slicer comprising a floor for receiving material, a feeding plate slidable on said floor, a cutter frame reciprocatively mounted adjacent said floor, and means operable by the movement of said cutter frame to advance said feeding plate, said means comprising a vertical reciprocating rod, a cable secured thereto, and a threaded rod operatively connected to said feeding plate and adapted to be operated by said cable.

5. In a slicer having a base adapted to receive material, a reciprocating cutter frame adjacent said base, a feeding member movable along said base, a threaded rod rotatably mounted adjacent said base, an arm connecting said feeding member to said rod whereby rotation of the rod will advance the feeding member, and a connecting mechanism between the cutter frame and the rod whereby movement of the cutter frame will rotate the rod; means for adjusting the amount of such rotation, and means for indicating the amount of advance of the feeding member.

6. In a slicer having a reciprocating cutter, a threaded rod rotatably mounted adjacent said cutter, a feeding member adapted to advance material to said cutter, and a clutch member mounted in said feeding member and adapted to engage the threads of said rod; yielding means for urging said clutch member into engagement with said threads, and means operable by the return stroke of said cutter to rotate said rod, said means being inoperative during the cutting stroke of said cutter.

7. In a device of the class described having a reciprocating cutter, and a feeding member for advancing material thereto; means operable by the movement of the cutter in one direction to advance the feeding member by a predetermined amount, means for adjusting said amount, and an indicator for said adjusting means.

8. In a slicer having a reciprocating cutter, and a feeding member for advancing material thereto; means operable by the return stroke of said cutter to advance said feeding member toward said cutter by a predetermined amount, said means being inoperative during the cutting stroke of said cutter, means for adjusting that amount, and an indicator for said adjusting means.

9. In a slicer having receiving means for material to be sliced, a post, a reciprocating cutter mounted thereon, and means operable by movement of said cutter in one direction to advance said material to said cutter; adjusting means mounted on said post to limit said movement and thereby limit the amount of said advance.

In testimony whereof, I have hereunto set my signature.

CHARLES H. VON GLAHN.